United States Patent [19]

Yamagata

[11] Patent Number: 5,764,800
[45] Date of Patent: Jun. 9, 1998

[54] IMAGE DATA RE-COMPRESSION DEVICE

[75] Inventor: Naoki Yamagata, Tokyo, Japan

[73] Assignee: Asahi Kogaku Kogyo Kabushiki Kaisha, Tokyo, Japan

[21] Appl. No.: 656,692

[22] Filed: May 31, 1996

[30] Foreign Application Priority Data

Jun. 1, 1995 [JP] Japan .................................. 7-158453

[51] Int. Cl.$^6$ .................................. G06K 9/36; H04N 5/76
[52] U.S. Cl. .................... 382/232; 382/239; 348/231; 348/232; 348/233
[58] Field of Search .................... 382/232, 240, 382/241, 239, 166; 348/231, 232, 233; 358/906, 430, 452, 404, 444; 395/115

[56] References Cited

U.S. PATENT DOCUMENTS

| | | | |
|---|---|---|---|
| 5,027,214 | 6/1991 | Fujimori | 348/233 |
| 5,034,804 | 7/1991 | Sasaki et al. | 348/232 |
| 5,249,053 | 9/1993 | Jain | 348/231 |
| 5,553,160 | 9/1996 | Dawson | 382/239 |

*Primary Examiner*—David K. Moore
*Assistant Examiner*—Wenpeng Chen
*Attorney, Agent, or Firm*—Greenblum & Bernstein, P.L.C.

[57] ABSTRACT

An actual recordable area in which no image data has been recorded is detected from a recording medium. The actual recordable area is divided by a file size of image data which are compressed with a maximum compression ratio, so that a number of actual recordable files is obtained. A potential recordable area is calculated under conditions under which the image data are to be compressed with a maximum compression ratio, and is divided by the file size so that a number of potential recordable files is obtained. The number of the actual recordable files and the number of the potential recordable files are added to each other, and thus, a number of expanded recordable files is obtained.

11 Claims, 6 Drawing Sheets

IMAGE DATA RE-COMPRESSION DEVICE

BACKGROUND OF THE INVENTION

1. Field of the Invention

The present invention relates to a device for re-compressing image data which have been compressed and recorded in a recording medium, the device being mounted in a still video camera, for example.

2. Description of the Related Art

Conventionally, there is known a still video camera in which an IC memory card is used as recording medium. The amount of image data is exceedingly large, and therefore, the number of files (i.e., a number of image frames) which can be recorded in a single IC memory is restricted to a predetermined degree. Thus, a process is proposed, in which original image data is compressed according to a predetermined algorithm, and is recorded in the IC memory card as compressed image data, so that the number of files which can be recorded in the single IC memory card is increased.

However, since some pixel information is omitted when the image data is compressed, detailed image information is lost from the image, and thus, the image quality is deteriorated. For resolving such a problem, a still video camera has been proposed, in which image data can be recorded in an IC memory card selectively in a non-compression condition or a compression condition, according to a choice of the photographer.

If all of the image data are recorded in the IC memory card in the non-compression condition, even image data which does not need to keep a high image quality occupies a large recording area of the IC memory card, so that a recording area for recording other image data is insufficient, and thus, in this case, the IC memory card cannot used with a high efficiency.

SUMMARY OF THE INVENTION

Therefore, an object of the present invention is to provide an image data re-compression device in which the recording efficiency of image data recorded to a recording area of the recording medium, such as an IC memory card, is improved.

According to the present invention, there is provided an image data re-compression device comprising a recording medium in which a plurality of files, each of which is defined by image data, can be recorded, detecting means, re-compressing means and obtaining means.

The image data can be compressed and recorded in the recording medium. The detecting means detects an actual recordable area, in which no image data have been recorded, from the recording medium. The re-compressing means re-compresses the image data, which have been recorded in the recording medium, with a compression ratio which is higher than another compression ratio with which the image data have been compressed and recorded in the recording medium, so that a potential recordable area, in which other image data can be recorded, can be generated in the recording medium. The obtaining means obtains a number of expanded recordable files, which number is a maximum number of files which become recordable due to a re-compression operation of the re-compression means, based on the actual recordable area and the potential recordable area which are generated by the re-compression operation.

Further, according to the present invention, there is provided a device for re-compressing image data, which has been compressed and recorded in a recording medium, with a compression ratio which is higher than that with which the image data has been compressed, the device comprising detecting means, obtaining means and indicating means.

The detecting means detects an actual recordable area which actually exists in the recording medium. The obtaining means obtains a number of expanded recordable files, which number is a maximum number of files which become recordable by re-compressing the image data, based on the actual recordable area and a potential recordable area which would be generated by re-compressing the image data. The indicating means indicates a number of files, which become recordable by re-compressing the image data with a predetermined compression ratio, based on the number of the expanded recordable files.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
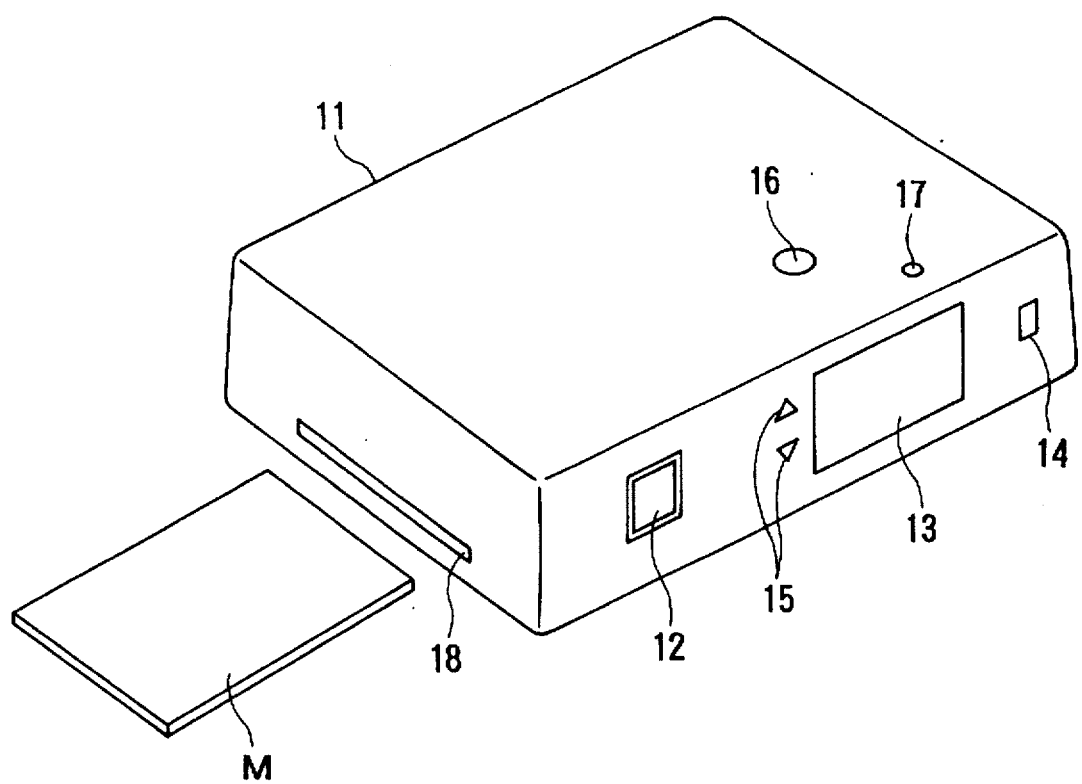
FIG. 1 is a perspective view showing a still video camera to which an embodiment of the present invention is applied.

FIG. 1 is an external view showing a still video camera to which an embodiment of the present invention is applied.

A view-finder 12 and a display device 13 are provided on a rear surface of a camera body 11. A mode select button 14 and feed and reverse buttons 15 are disposed close to the display device 13. The mode select button 14 is provided for switching an operation mode of the still video camera among a photographing mode, a reproduction mode and a re-compression mode. The feed and reverse buttons 15 are provided for feeding and reversing a file corresponding to image data recorded in a recording medium, so that the image data to be reproduced is designated.

A release button 16 and a compression mode ratio select button 17 are provided on an upper surface of the camera body 11. The release button 16 is used as an operation button for re-compressing image data recorded in the recording medium, besides for performing a shutter release. The release button 16 is connected to a double action type switch (not shown), so that, when the release button 16 is partly depressed, a photometry switch (not shown) is turned ON, and when the release button 16 is completely depressed, a release switch (not shown) is turned ON. A slot 18 is formed in a side of the camera body 11 so that an IC memory card M which is a recording medium can be inserted into the camera body 11.

Figure 2:
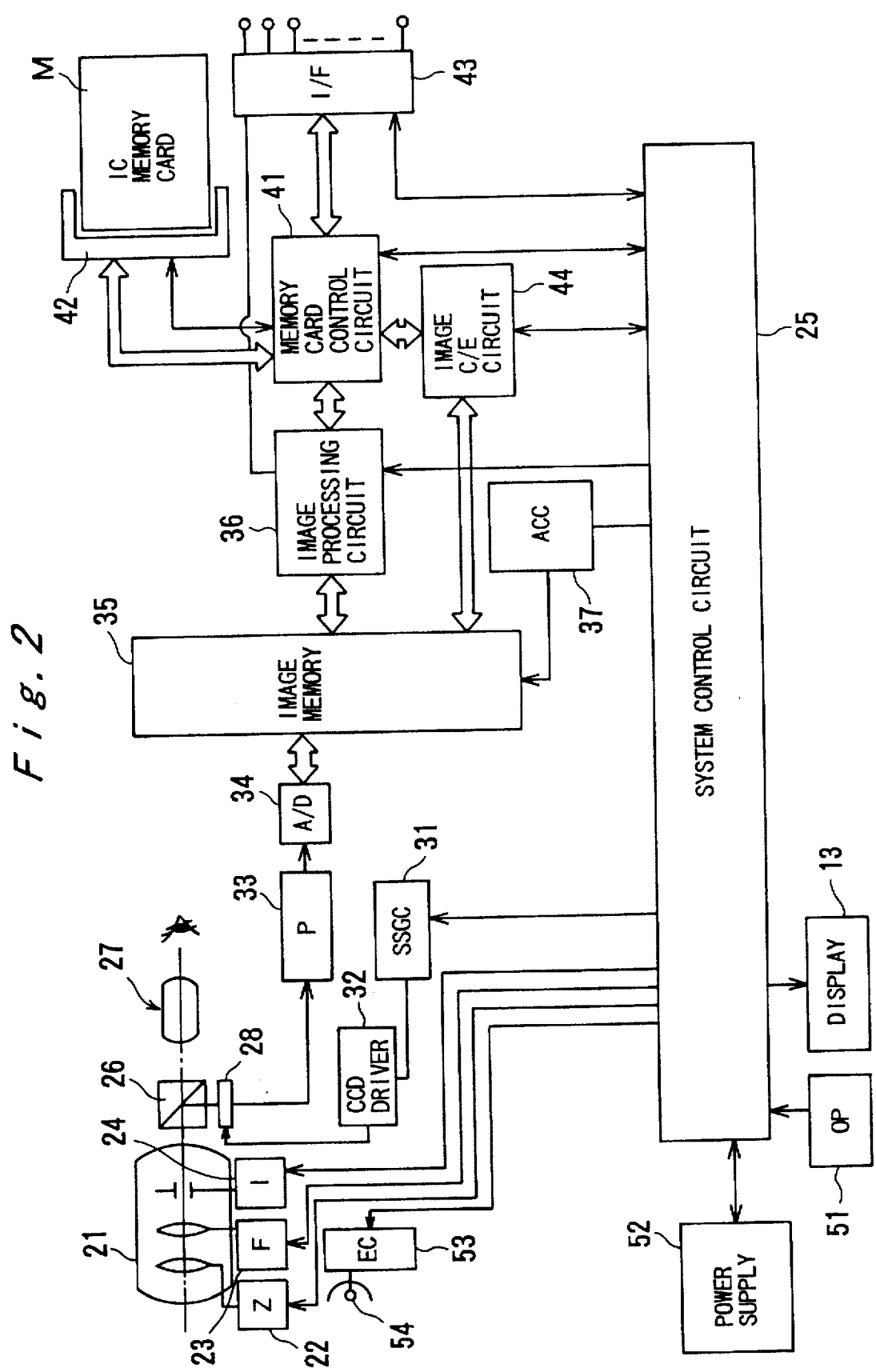
FIG. 2 is a block diagram showing an electric circuit provided in the still video camera.

FIG. 2 is a block diagram showing an electric circuit provided in the still video camera.

A photographing optical system 21 is connected to a zoom drive circuit 22, a focus drive circuit 23 and an iris drive circuit 24, respectively. These circuits 22, 23 and 24 are controlled by a system control circuit 25, so that a zooming operation, an auto-focusing operation and an auto-exposure operation of the photographing optical system 21 are performed.

A half-mirror 26 is disposed behind the photographing optical system 21 so that a light beam led from the photographing optical system 21 is split into two beams. One of the beams is led to a finder optical system 27, and the other of the beams is led to a CCD 28. The CCD 28 is driven by a CCD driver 32 which is controlled based on a synchronization signal outputted from a synchronization signal generation circuit 31, which is controlled by the system control circuit 25.

An image signal outputted by the CCD 28 is subjected to a predetermined process in a processing circuit 33, and then, is converted to digital image data by an A/D convertor 34. The digital image data is stored in an image memory 35. When the image data is recorded to the IC memory card M, the image data is read from the image memory 35, and is subjected to a predetermined process by an image processing circuit 36. The storing and reading operations of the image data in the image memory 35 are performed under the control of an address control circuit 37, controlled by the system control circuit 25.

The image data outputted from the image processing circuit 36 is recorded to the IC memory card M through a memory card control circuit 41 and a connector 42. The image data can be outputted to a monitor device (not shown) through an interface circuit 43. When the image data is recorded to the IC memory card M, the image data can be compressed in an image compression-expansion circuit 44. The image data which has been compressed and recorded to the IC memory card M to subjected to an expansion process in the image compression-expansion circuit 44 when the image data is read out from the IC memory card M.

An operation unit 51, in which the mode select button 14 and the feed-reverse button 15 are provided; the display device 13, which indicates a set condition of the still video camera; and a power supply 52 are connected to the system control circuit 25. An electronic flash 54 is connected to the system control circuit through an electronic flash control circuit 53.

A plurality of files, each of which is defined by image data, can be recorded to the IC memory card M. The image data can be compressed, and is recorded in the IC memory card M.

Figure 3:
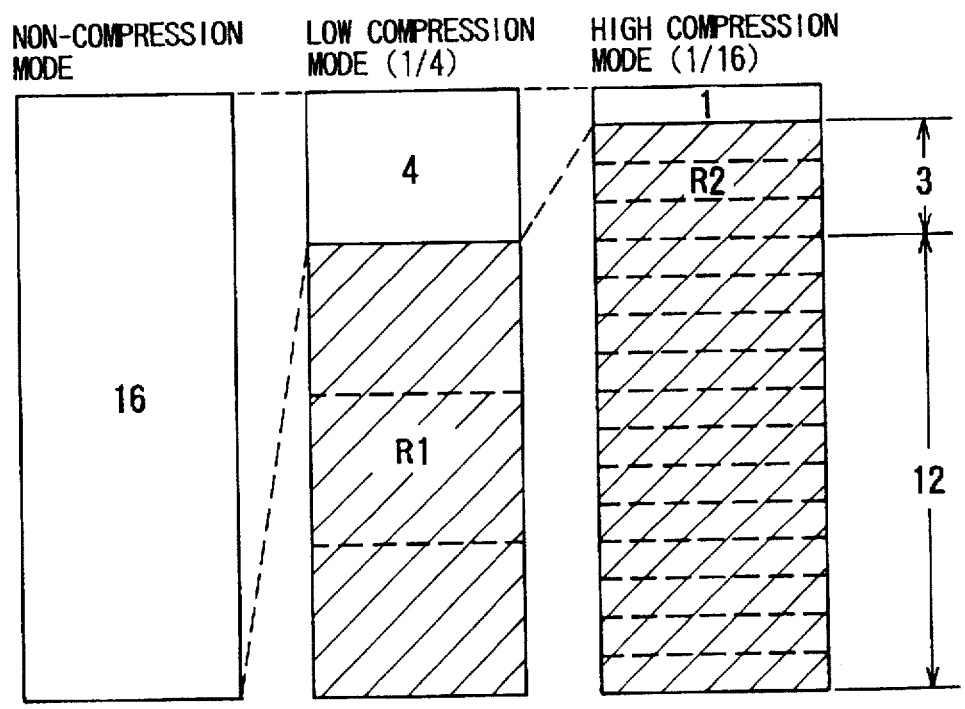
FIG. 3 is a view showing file sizes of image data when the image data is recorded in a non-compression mode, a low compression mode and a high compression mode, respectively.

The image data is recorded in the IC memory card M in a non-compression mode, in a low compression mode or in a high compression mode. As shown in FIG. 3, if the size of the original image data is 16, the file size of image data recorded to the non-compression mode is also 16, since the original image data is not compressed. In the low compression mode, the file size of the recorded image data is 4, and in the high compression mode, the file size of the recorded image data is 1.

Namely, a ratio of the file size of image data recorded in the low compression mode to the file size of image data recorded in the non-compression mode is ¼. A ratio of the file size of image data recorded in the high compression mode to the file size of image data recorded in the non-compression mode is ¹⁄₁₆. Thus, the original image data is compressed by ¼ and ¹⁄₁₆, in the low compression mode and in the high compression, respectively, and the compression ratio of the low compression mode to the non-compression mode is the same as that of the high compression mode to the low compression mode. The compressing operation is performed according to the JPEG (Joint Photograph Expert Group) algorithm.

Note that, in the embodiment, the re-compression means a process in which the file size of the image data which has already been recorded to the memory card M is reduced. In the re-compression, if the image data has already been recorded in the IC memory card M in the low compression mode, the image data is expanded in the compression-expansion circuit 44 so that the image data is restored to the non-compression mode, and then, is compressed again in the high compression mode. On the other hand, if the image data has already been recorded in the IC memory card M in the non-compression mode, then the image data is compressed in the low compression mode, the compression ratio of which is the lowest.

As described later, by re-compressing the image data recorded in the IC memory card M, a recordable area, which has not been used in the IC memory card M, can be expanded. For example, if the image data of the non-compression mode is compressed by one step, a recordable area (reference R1 in FIG. 3), in which 12 files of the image data of the high compression mode can be recorded, is generated. If the image data of the low compression mode is compressed by one step, a recordable area (reference R2 in FIG. 3), in which 3 files of the image data of the high compression mode can be recorded, is generated.

Thus, the recordable areas (R1 and R2) which are generated by re-compressing the image data is referred to as a potential recordable area hereinafter. Namely, in the case of the image data of the non-compression mode, the maximum number of files corresponding to the potential recordable area is 12, which is obtained by comparing a recordable area included in the IC memory card M in which the image data is compressed in the low compression mode with a recordable area included in the IC memory card M in which the image data have not been compressed. Similarly, in the case of the image data of the low compression mode, the maximum number of files corresponding to the potential recordable area is 3.

Figure 4A:
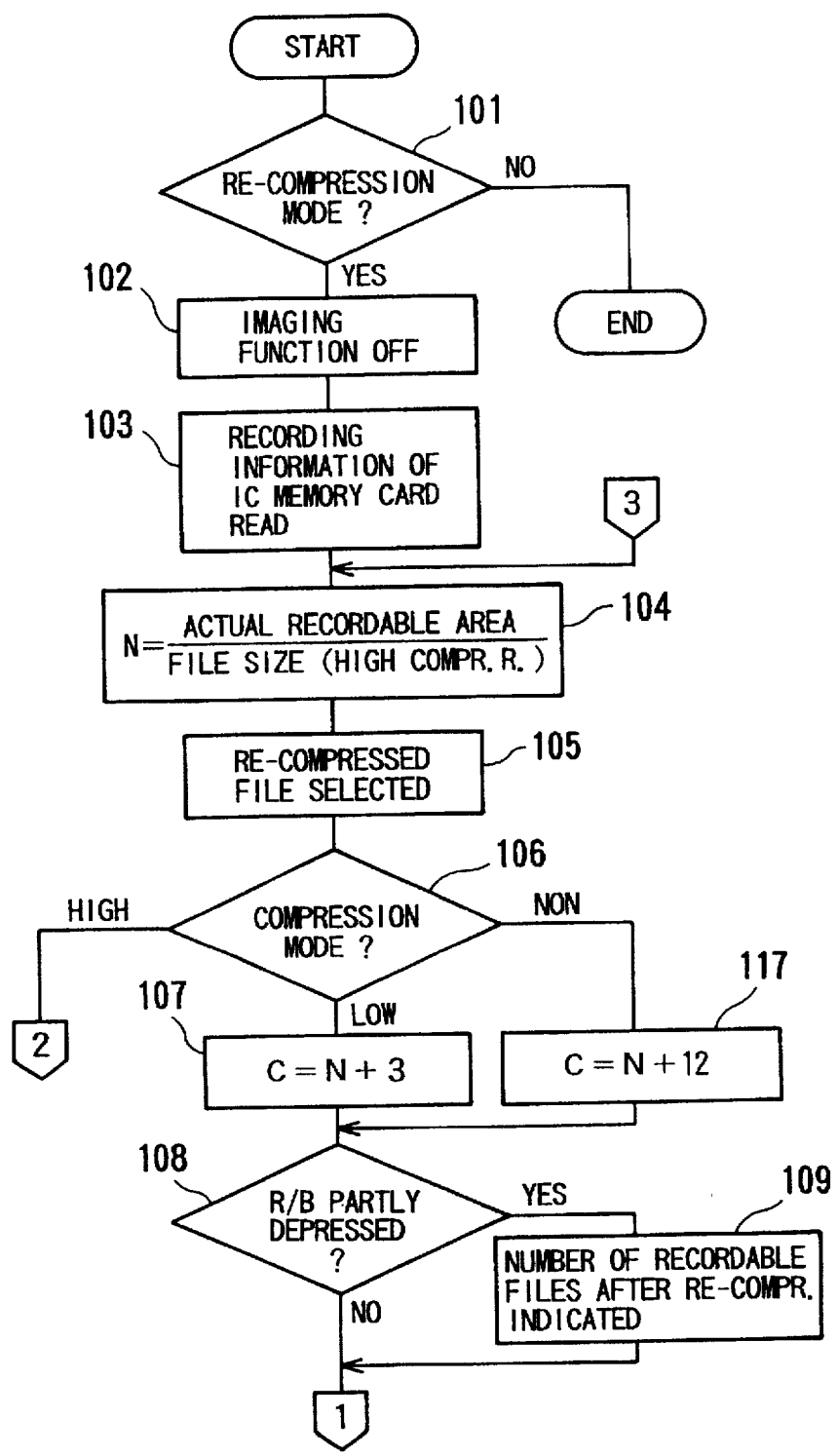
FIGS. 4A and 4B are first and second parts of a flow chart of a program performing a re-compression mode.
Figure 4B:
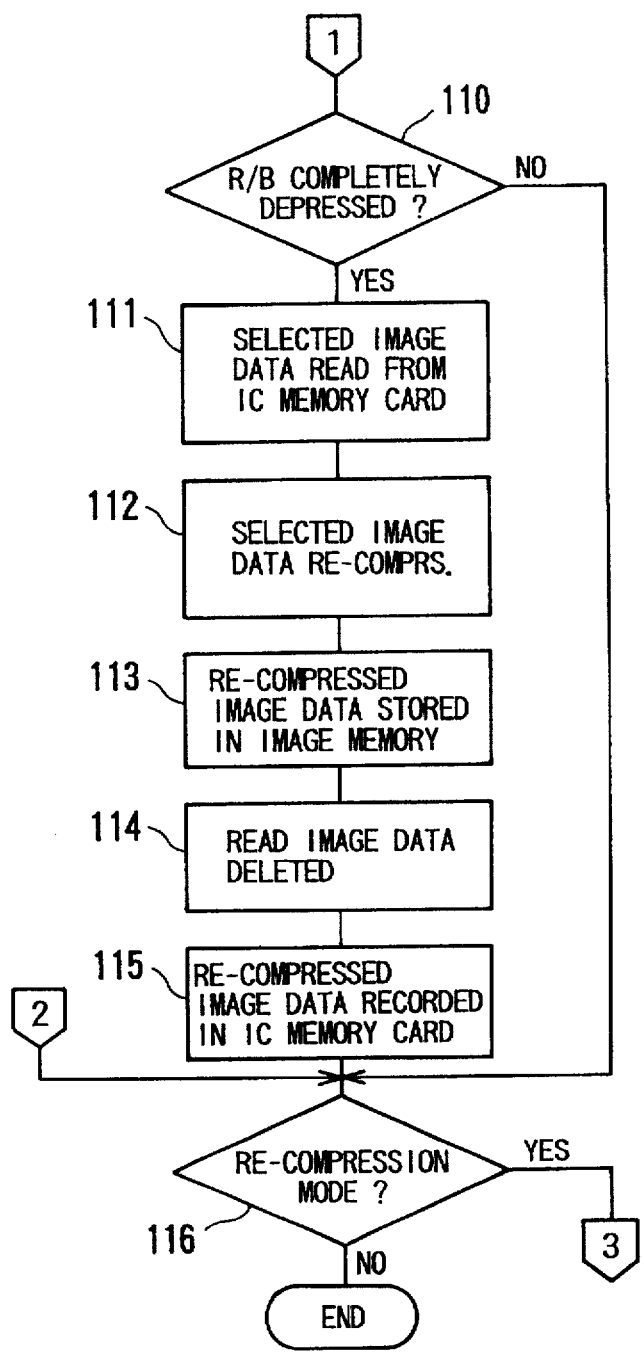
Figure 5:
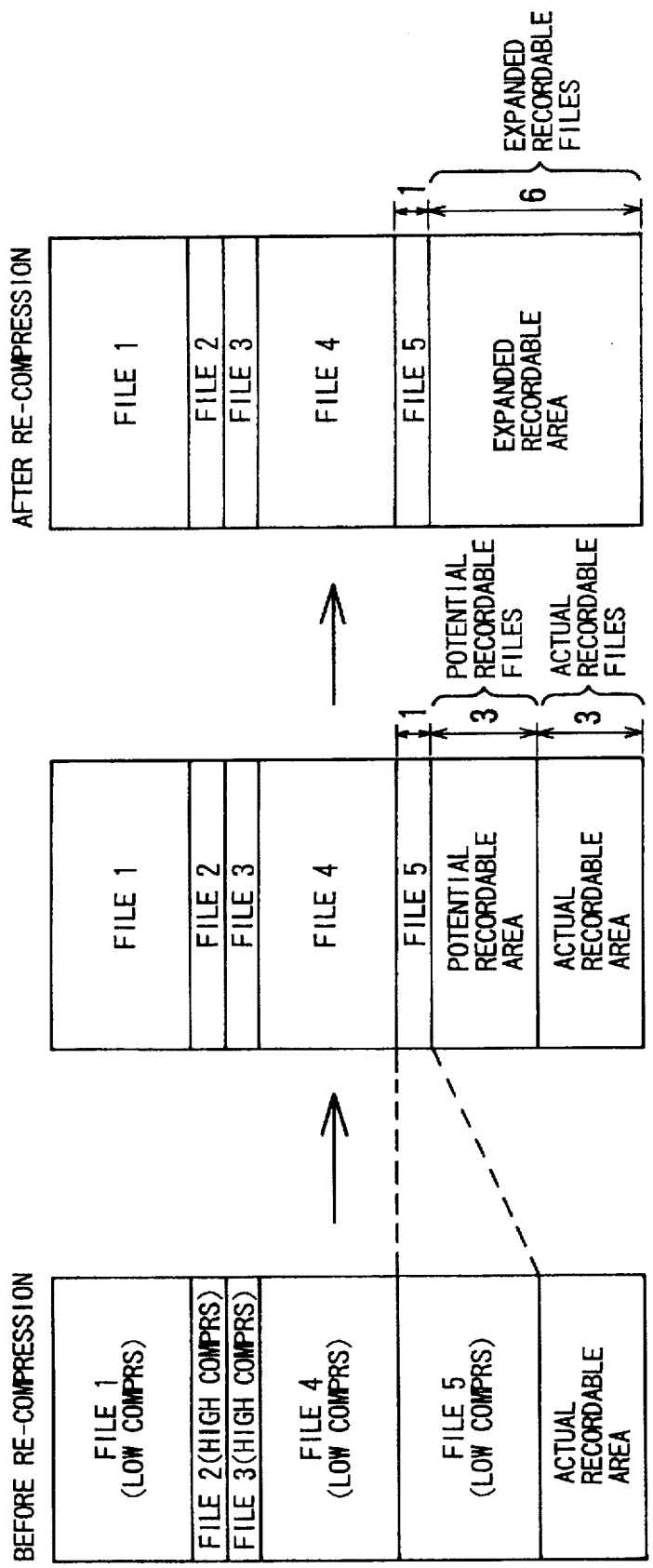
FIG. 5 is a view showing a change of a recording condition in an IC memory card when image data recording in a low compression mode is re-compressed in a high compression mode.

FIGS. 4A and 4B show a flow chart of a program of the re-compression mode in which image data, which have been recorded in the IC memory card M, are re-compressed. FIG. 5 shows an example of change of a recording condition to the IC memory card M in which image data recorded in the low compression mode is re-compressed in the high compression mode. With reference to these drawings, an operation of the embodiment will be described below.

In Step 101, it is determined whether the re-compression mode has been set by the mode select button 14. When the re-compression mode has not been set, this program is ended immediately. Conversely, when the re-compression mode has been set, Step 102 and the following Steps are executed so that the re-compression operation is performed.

In Step 102, the CCD driver 32 is set to an OFF condition, so that an imaging function of the CCD 28 is stopped. In Step 103, recording information recorded to the IC memory card M is read so that the image data recorded to the IC memory card M is searched, and thus, the recording condition of the IC memory card M is checked. Now, it is supposed that, as shown in FIG. 5, each of the image data of files 1, 4 and 5 have been recorded in the low compression mode, each of the image data of the files 2 and 3 have been recorded in high compression mode, and the size of a recordable area is three file's worth of image data if recorded in the high compression mode.

In Step 104, an actual recordable area, in which no image data has been recorded, is detected from the IC memory card M, and is divided by a file size of image data which is compressed with the high compression ratio (=1/16), so that the number of files N (i.e., 3 in the example shown in FIG. 5) is obtained. Namely, the number of files N is the number of images which are compressed with the maximum compression ratio and can be recorded in the actual recordable area. The number of files N is the maximum number of files which are actually recordable (i.e., the actual recordable files).

In Step 105, a file which is going to be re-compressed is selected. Now, it is supposed that file 5 is to be re-compressed, as shown in FIG. 5. In Step 106, the kind of compression mode with which the file is re-compressed is determined. Since file 5 has been recorded in the low-compression mode, Step 107 is executed, in which the number of actual recordable files N obtained in Step 104 is added to a number of potential recordable files (i.e., 3) corresponding to the potential recordable area, so that a maximum number of files C which become recordable due to a re-compression operation is obtained. The maximum number of files C is the number of expanded recordable files shown in FIG. 5, and is 6 in the example of FIG. 5.

In Step 108, it is determined whether the release button 16 is partly depressed, namely whether the photometry switch is turned ON. In the re-compression mode, the release button 16 is not used for an operation, such as photometry and distance measurement as in a photographing operation, but is used for indicating the number of files, which can be recorded after the re-compression operation, on the display device 13, and is used for performing the re-compression operation.

When the release button 16 is partly depressed, Step 109 is executed, so that the number of files which can be recorded after the re-compression operation is indicated on the display device 13. The number of files is indicated on the display device 13 in the order of cases in which: image data, which is to be recorded to the IC memory card M, is not compressed; is compressed in the low-compression mode; and, is compressed in the high compression mode. As understood from FIG. 3, the number of the expanded recordable files must be more than or equal to 16 to record the image data in the non-compression mode, and must be more than or equal to 4 to record the image data in the low compression mode. In the example of FIG. 5, since the number of the expanded recordable files is 6, the number of files which can be recorded to the IC memory card M is 0 (=6/16) if the image data is recorded in the non-compression mode, is 1 (=6/4) if the image data is recorded in the low compression mode, and is 6 if the image data is recorded in the high compression mode. Therefore, in Step 109, the numerals 0, 1 and 6 are indicated in this order in turn at 2 second intervals, for example.

When it is determined in Step 108 that the release button 16 is not partly depressed, Step 110 is executed, in which it is determined whether the release button 16 is completely depressed; namely, whether the release switch is turned ON. When the release button 16 is completely depressed, Steps 111 through 115 are executed, so that the image data selected in Step 105 is re-compressed.

In Step 111, the selected image data is read from the IC memory card M, and in Step 112, the selected image data is re-compressed with a new compression ratio which is higher than the present compression ratio with which the selected image data has been compressed. The new compression ratio is higher than the present compression ratio by one step. For example, in the case of the image data of file 5 shown in FIG. 5, since the present compression ratio is 1/4 (the low compression mode), the image data is re-compressed with the high compression ratio 1/16 in Step 112. If the image data recorded to the IC memory card M has not been compressed, the image data is compressed with the low compression ratio.

The re-compressed image data is stored in the image memory 35 in Step 113. When the storing operation is completed, Step 114 is executed so that the image data read in Step 111 is deleted from the IC memory card M. Then, in Step 115, the re-compressed image data is read out from the image memory 35 and is recorded to the IC memory card M.

Conversely, when it is determined in Step 110 that the release button 16 is not completely depressed, Steps 111 through 115 are skipped.

In Step 116, it is determined whether the re-compression mode is set. When the re-compression mode is still set, the process returns to Step 104, and thus, the operations described above are executed. When the re-compression mode has been released, this program is ended.

When it is determined in Step 106 that the image data which is going to be re-compressed has been recorded in the non-compression mode, Step 117 is executed, in which the number of actual recordable files N obtained in Step 104 is added to the number of files (i.e., 12) corresponding to the potential recordable area, so that a maximum number of files C which become recordable due to the re-compression operation is obtained. Then, Step 108 and the following Steps are executed.

When it is determined in Step 106 that the image data which is going to be re-compressed has already been recorded in the high compression mode, since the image data can not be further re-compressed, Steps 107 though 115 are skipped.

As described above, since the image data which has been recorded to the IC memory card M can be re-compressed if necessary, new image data can be recorded to the IC memory card M, and thus, the record efficiency of the IC memory card M is improved. Further, since the number of files which would become recordable after the re-compression operation is indicated by the display device 13, a compression ratio with which new image data to be recorded to the IC memory card M can be selected properly.

Note that the degree of the compression ratio and the number of the compression modes are not restricted to those of the embodiment described above, and can be freely selected in accordance with the object of the device.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 7-158453 (filed on Jun. 1, 1995) which is expressly incorporated herein, by reference, in its entirety.

I claim:

1. An image data re-compression device, comprising:
    a recording medium, in which a plurality of files, each of which is defined by image data, can be recorded, said image data being able to be compressed and recorded to said recording medium;
    means for detecting an actual recordable area, in which no image data has been recorded, from said recording medium;

means for re-compressing said image data, which has been recorded in said recording medium, with a compression ratio which is higher than another compression ratio with which said image data has been compressed and recorded to said recording medium, so that a potential recordable area, in which other image data can be recorded, can be generated in said recording medium; and means for obtaining a number of expanded recordable files, which number is a maximum number of files which become recordable due to a re-compression operation of said re-compressing means, based on said actual recordable area and said potential recordable area which are generated by said re-compression operation.

2. A device according to claim 1, further comprising means for indicating a number of files which become recordable due to said re-compression operation using a predetermined compression ratio, based on the number of expanded recordable files.

3. A device according to claim 1, wherein said obtaining means comprises:

means for dividing a size of said actual recordable area by a size of a file which is obtained by compressing image data with a maximum compression ratio with which said re-compressing means can compress said image data, so that a number of actual recordable files, which number is a maximum number of files which are actually recordable in said recording medium, is obtained; and means for adding the number of said actual recordable files to the number of files corresponding to said potential recordable area, so that the number of said expanded recordable files is obtained.

4. A device according to claim 1, further comprising:

means for storing said image data, which is re-compressed by said re-compressing means, in a memory; and means for deleting said image data from said recording medium after said image data is stored in said memory.

5. A device according to claim 1, wherein said re-compressing means re-compresses said image data with a compression ratio which is higher by one step than that with which said image data has been compressed.

6. A device according to claim 1, wherein said re-compressing means compresses said image data with a lowest compression ratio with which said re-compressing means can compress said image data, when said image data has not been compressed.

7. A device according to claim 1, wherein said re-compressing means re-compresses said image data to compressed image data having a predetermined data length.

8. A device according to claim 1, wherein said image data are compressed according to the JPEG algorithm.

9. A device according to claim 1, wherein said image data is recorded to said recording medium in one of a non-compression mode in which original image data is not compressed, in a low compression mode in which said original image data is compressed by $\frac{1}{4}$, and in a high compression mode in which said original image data is compressed by $\frac{1}{16}$.

10. A device according to claim 1, wherein said recording medium is an IC memory card.

11. A device for re-compressing image data, which has been compressed and recorded to a recording medium, with a compression ratio which is higher than that with which said image data have been compressed, said device comprising:

means for detecting an actual recordable area which actually exists in said recording medium;

means for obtaining a number of expanded recordable files, which number is a maximum number of files which become recordable by re-compressing said image data, based on said actual recordable area and a potential recordable area which would be generated by re-compressing said image data; and means for indicating a number of files which become recordable by re-compressing said image data with a predetermined compression ratio, based on the number of said expanded recordable files.

* * * * *